Oct. 18, 1966 M. J. EVERS 3,279,633
FOOD HANDLING APPARATUS
Filed Nov. 20, 1964 2 Sheets-Sheet 1
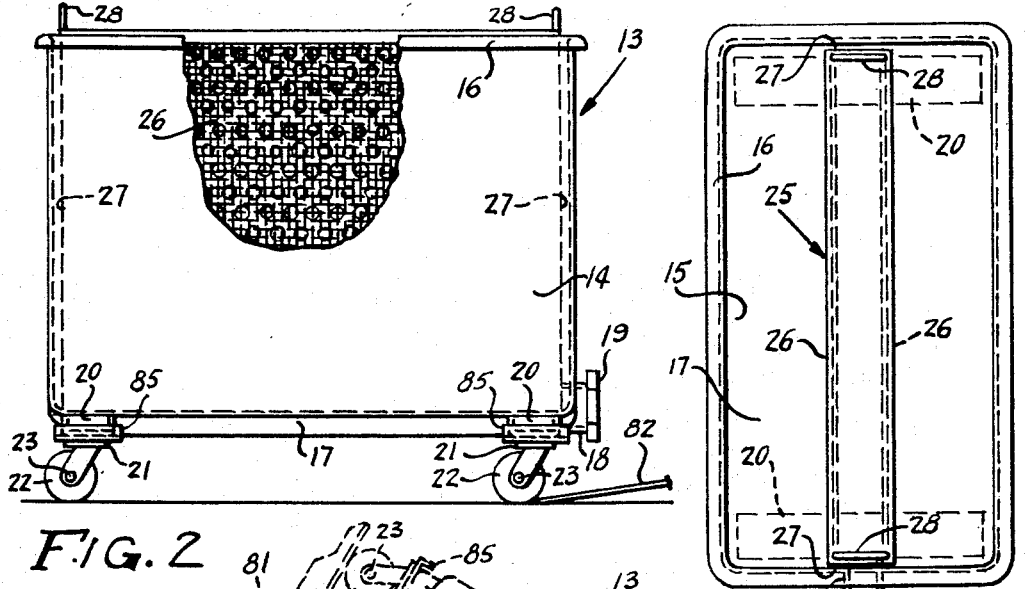
FIG. 2
FIG. 3
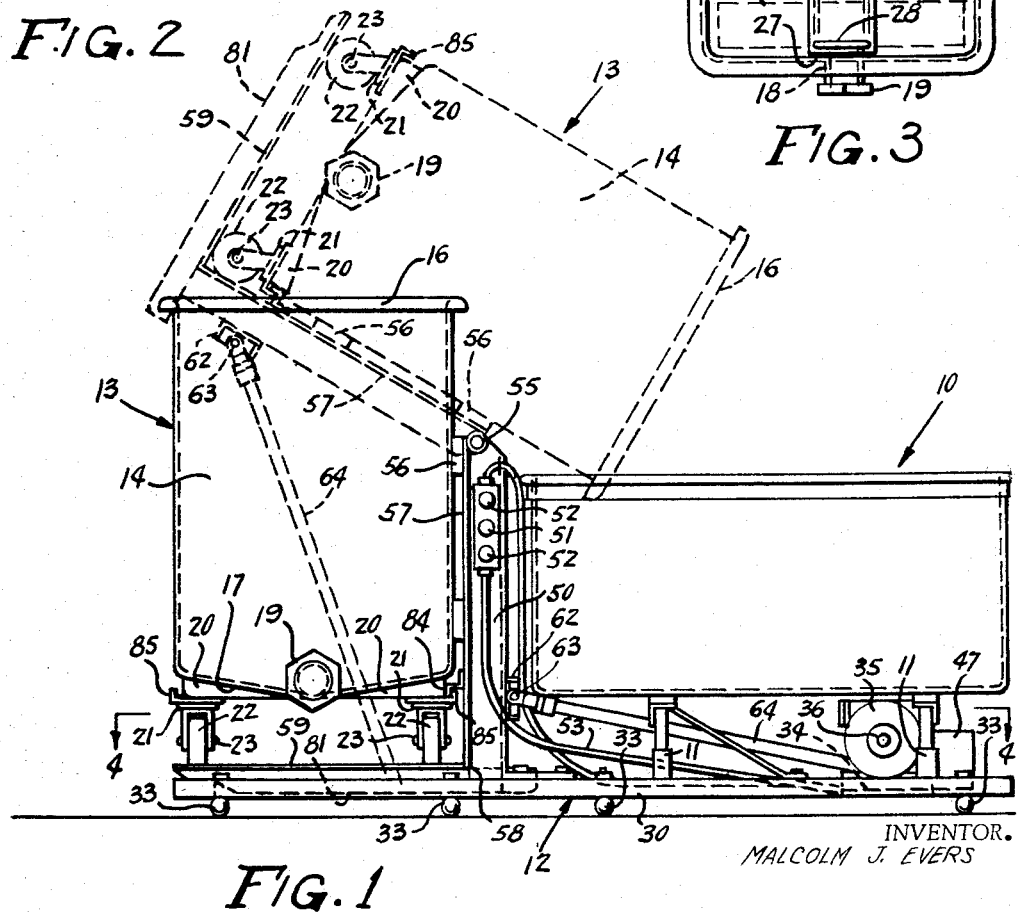
FIG. 1
INVENTOR.
MALCOLM J. EVERS
BY *Kimmel & Crowell*
ATTORNEYS.

Oct. 18, 1966     M. J. EVERS     3,279,633
FOOD HANDLING APPARATUS

Filed Nov. 20, 1964     2 Sheets-Sheet 2

INVENTOR.
MALCOLM J. EVERS

BY *Kimmel & Crowell*
ATTORNEYS.

United States Patent Office 3,279,633
Patented Oct. 18, 1966

3,279,633
FOOD HANDLING APPARATUS
Malcolm J. Evers, Sioux Falls, S. Dak., assignor to Nordica Foods Co., Inc., Sioux Falls, S. Dak.
Filed Nov. 20, 1964, Ser. No. 412,692
9 Claims. (Cl. 214—302)

This invention relates to a food handling and processing apparatus and has particular applicability to an apparatus for handling cottage cheese curd.

As conductive to a clear understanding of this invention, it may here be pointed out that heretofore small cottage cheese manufacturers have employed relatively small cans for storage of dry and creamed cottage cheese. These cans have always provided a maintenance problem and require considerable time expended in handling and cleaning. Many of these cans are made of tinned steel, although the health departments are now discouraging the use of such tin cans, and stainless steel cans are available although considerably more expensive. Larger stainless steel draining cans are available, for use in conjunction with specific mechanical blenders, but due to their relatively large physical size and cost of such equipment, have heretofore been difficult to handle in the case of small companies. An important object of this invention is the provision of a wheeled stainless steel draining cart of large capacity, adapted for use with a relatively low cost blender, together with the provision of a relatively inexpensive and practical dumping apparatus.

An additional object of the invention is the provision of an improved curd tank of large capacity provided with a full length double screen strainer, which permits the tank to be filled by pumping or gravity flowing the curd with its last wash water into the tank. Because of the large draining surface area, the wash water separates from the curd at such a rate that as soon as the tank is full, the strainer can be removed, and the tank is ready for either dumping or storage for later use. The tank may then be run onto a horizontal platform comprising an element of the dumping device of the instant invention, and automatically secured thereto, and the dumping device actuated to dump the curd, after drainage of the wash water, into a relatively large blending tank for further processing.

An additional object of the invention is the provision of the dumping apparatus including a lift platform which requires relatively little floor space, which requires a low electrical power demand, wherein positive load control in raising and lowering of the load is provided, and which requires extremely low maintenance cost.

A further object of the invention is the provision of an apparatus of this character wherein the side wall of the curd wagon becomes a pouring lip for the product, wherein the parts are easily cleaned, and wherein there is little chance for product contamination.

Still another object of the invention is the provision of apparatus of this nature which is sturdy and durable in construction, reliable and efficient in operation and relatively simple and inexpensive to manufacture, assemble and utilize.

Still other objects will be in part be obvious and in part be pointed out as the description of the invention proceeds and shown in the accompanying drawings, wherein:

FIGURE 1 is a side elevational view of one form of apparatus embodying the instant inventive concept, disclosing the tank, the curd wagon, and the lifting and dumping apparatus, the apparatus being indicated in dumping position in dotted lines;

FIGURE 2 is a side elevational view, partially broken away, showing the cart of the instant invention;

FIGURE 3 is a top plan view of the cart of FIGURE 2;

Similar reference characters refer to similar parts throughout the several views of the drawing.

Figure 4:
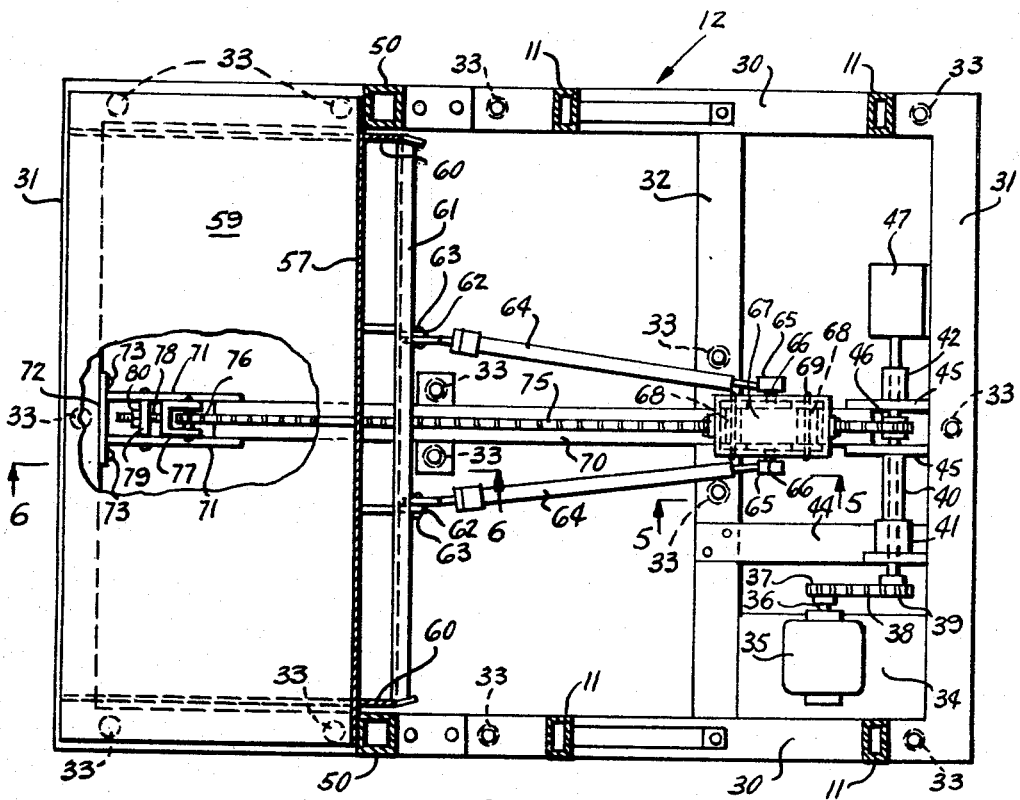
FIGURE 4 is a sectional view taken substantially along the line 4—4 of FIGURE 1, showing details of construction of the dumping apparatus.
Figure 6:
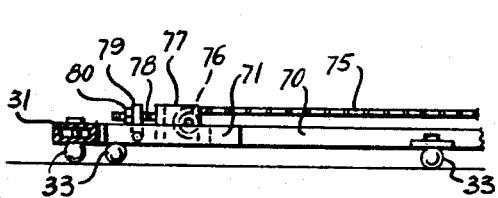
FIGURE 6 is a fragmentary sectional view taken substantially along the line 6—6 of FIGURE 4, as viewed in the direction indicated by the arrows.
Figure 5:
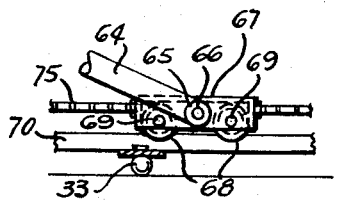
FIGURE 5 is a fragmentary sectional view taken substantially along the line 5—5 of FIGURE 4, as viewed in the direction indicated by the arrows.

Having reference now to the drawings in detail, and more particularly to FIGURE 1, there is generally indicated at 10 a blending tank, in this instance for cottage cheese, of any desired conventional construction, and provided with the usual blending accessories (not shown). The tank is supported on legs 11, which may be mounted on the floor, or which may be carried by a base frame generally indicated at 12 which supports and carries the cart dumping apparatus comprising an element of the instant invention. The third element of this system comprises a drainage cart, generally indicated at 13.

Referring first to the drainage cart 13, the same is comprised of a substantially rectangular body portion 14, having an open top 15 surrounded by an arcuate depending rim 16, which comprises a pouring lip. The bottom of the tank is substantially V-shaped, as indicated at 17, and has at one end a drainage opening 18 which is closed by a threaded plug 19. Triangular caster wheels supports 20 extend across each end of the tank to provide a level support for swivelable caster yokes 21, which carry rotatable caster wheels 22 mounted on axles 23.

A double walled perforated strainer, generally indicated at 25, is adapted to be positioned in the longitudinal center of the cart, and includes a pair of spaced perforate side walls 26, and solid end plates 27 which are provided with lifting handles 28. The lower portion of one of the end walls is provided with an opening in alignment with the opening 18 so that drainage can be readily effected prior to dumping of the cart 13 into the tank 10, in a manner to be described more fully hereinafter.

Referring now to the frame 12, it will be seen that, as best shown in FIGURE 4, the same includes a pair of side supports 30, which, in the illustrative embodiment shown, carries the uprights 11 which carry the tank 10. Members 30 are connected at their ends by transverse supports 31. An intermediate transverse member 32 also extends between the side members 30. The members 30, 31 and 32 may be constructed of angle iron, channel iron, or structural tubing, as desired, and may be supported on ball feet 33. A plate 34 is mounted between one of members 31 and transverse member 32 and carries an electric gear motor 35 which is provided with a drive shaft 36 driving a sprocket 37. Sprocket 37 is connected by a chain 38 with a sprocket 39 which is carried on an axle 40. The latter is journaled in bearings 41 and 42, bearing 41 being mounted on a strip support 44 extending between rear member 31 and transverse member 32. The other bearing is carried by one of a pair of bracket members 45 which are securely affixed to transverse member 31, between which is mounted a sprocket 46, the purpose of which will be more fully described hereinafter. The opposite end of shaft 40 extends into a control box 47.

A pair of spaced, relatively heavy uprights 50 extend vertically from members 30 adjacent the edge of tank 10, and one of the members 50 carries a control box 51 provided with control buttons 52 which reversibly control, through cables 53 and control box 47, the action of motor 35.

Pivots 55 at the upper ends of uprights 50 are connected to lugs 56 carried by a normally vertical plate 57 comprising a portion of the lifting apparatus, to the lower end 58 of which is connected a normally horizontal plate 59.

Braces 60 extend rearwardly from plate 57 between uprights 50 and carry a bar 61, from which lugs 62 extend inwardly, and are connected by means of pivots 63 to the perforated ends of adjustable links or arms 64. The other ends of links 64 include eyes 65, which are rotatably mounted on arms or shafts 66 which extend from opposite sides of a movable block 67. The block 67 has rotatably mounted flanged rollers 68 mounted on transverse axles 69 extending thereacross, and is movable on a linearly extending track 70, which is secured at one end between the members 45, and at its other end between a pair of members 71 which extend from the opposite frame member 31. The frame members 71 are mounted on a plate 72 and bolted by means of bolts 73 to the forward frame member.

From the foregoing it will be seen that linear movement of the block 67 along track 70 will move the rods 64 from the full line position shown in FIGURE 1, for example, to the doted line position therein, which will effect swinging of the normally vertical plate 57 and the normally horizontal plate 59 to the uplifted position shown. This linear movement of the box 67 is effectuated by means of an endless chain 75, which at one end extends around the sprocket 46 which is driven by the gear motor 35, and at its other end extends around a sprocket 76 which is mounted in the linearly movable yoke 77, the latter being carried on a bolt 78 which extends through a lug 79, extending upwardly from the supporting brackets 71. An adjusting nut 80 is provided on the end of the bolt to vary the tension of the chain.

Flanges 81 depend from the underside of plate 59 and serve to support the same level on members 30, for the reception of the cart 13, which is wheeled thereon by means of a removable ramp 82 (see FIGURE 2).

Means are provided for holding a cart 13 in position when raised for tilting, and take the form of a normally horizontal depending flange 84 carried at an intermediate point by plate 57 which engages with upwardly extending flanges 85 which are carried by each portion 20 adjacent the swivel yoke 21.

From the foregoing the use and operation of the device should now be readily apparent. One of carts 13 is filled either by pumping or by gravity flow with the cottage cheese curd while still in its last wash water. The wash water drains through the screens 26 into the central space, and is withdrawn by removal of the plug 19. After the water is drained off, the strainer 25 is removed by means of handles 28, and the filled cart is moved up ramp 82 on the platform 59, the flanges 84 and 85 inter-engaging to hold the cart thereon. Gear motor 35 is then actuated through one of the switch buttons 52 which moves the block 67 to actuate links or arms 64 which raise platform 59 and cart 13 to the dotted line position of FIGURE 1, at which time the curd is dumped into the tank 10 for further processing.

While in the foregoing the apparatus has been described, particularly in conjunction with the manufacture and processing of cottage cheese, it is to be understood that the components thereof may be readily adapted to the processing of other food products or the like.

From the foregoing it will now be seen that there is herein provided an improved apparatus for the processing of foodstuffs which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. Apparatus for handling food products comprising in combination, a blending tank, a wheeled drainage cart, and apparatus for dumping said cart into said tank, said apparatus comprising a base frame, a pair of uprights carried by said frame adjacent said tank, a normally vertical member pivoted at its top to the tops of said uprights, a normally horizontal plate secured at one edge to said normally vertical member, means releasably securing said cart on said plate and means for rotating said normally vertical member about its pivot point to dump the contents of said cart into said tank, said last mentioned means comprising a track on said frame, a block movable on said track in a direction toward and away from said tank, a pair of links pivoted at one of their ends to said block and pivoted at their other ends to a point adjacent the base of said normally vertical member, and power means for moving said block.

2. The structure of claim 1 wherein said last mentioned means comprises sprockets at each end of said track, an endless chain extending over said sprockets and connected to said block, and reversible motor means for rotating one of said spindles.

3. The structure of claim 2 wherein said block includes roller bearing means movable along said track.

4. The structure of claim 3 wherein said means releasably securing said cart on said plate comprises a depending flange on said normally vertical member, and upwardly extending flanges on the lower portion of said cart interengageable with said depending flange.

5. The structure of claim 4 wherein motor control means are provided for said motor means and comprise a switch box located adjacent the top of one of said uprights.

6. Apparatus for dumping a cart comprising in combination, a base frame, uprights carried by said frame, a normally vertical member pivoted at its upper end to the tops of said uprights, a normally horizontal base plate secured to said normally vertical member adapted to support a cart, means adapted releasably to secure said cart to said plate, and means for rotating said normally vertical member about its pivot to lift said plate, whereby to lift and dump the cart supported thereby, said last mentioned means comprising a track on said frame, a block movable on said track, a pair of links pivoted at one of their ends to said block and pivoted at their other end to a point adjacent the base of said normally vertical member, and power means for moving said block.

7. The structure of claim 6 wherein said last-mentioned means comprises sprockets at each end of said track, an endless chain extending over said sprockets and connected to said block, and reversible motor means for rotating one of said spindles.

8. The structure of claim 7 wherein said block includes roller bearing means movable along said track.

9. The structure of claim 8 wherein motor control means are provided for said motor means, and comprise a switch box located adjacent the top of one of said uprights.

References Cited by the Examiner

UNITED STATES PATENTS

| 781,497 | 1/1905 | Culliton | 214—52 |
|---|---|---|---|
| 2,260,697 | 10/1941 | Allen | 214—314 |
| 2,314,647 | 3/1943 | Longenecker | 214—302 |
| 2,663,081 | 12/1953 | Hensgen | 31—48 |
| 2,844,264 | 7/1958 | Stirm et al. | 214—314 |
| 3,016,610 | 1/1962 | Collins | 31—48 |

HUGO O. SCHULZ, *Primary Examiner.*